United States Patent
Adrianus Van Overbruggen (10) Patent No.: US 10,262,118 B2
(45) Date of Patent: Apr. 16, 2019

(54) SYSTEMS AND METHODS FOR AUTHENTICATING DIGITAL CONTENT

(71) Applicant: Robert Antonius Adrianus Van Overbruggen, Rotterdam (NL)

(72) Inventor: Robert Antonius Adrianus Van Overbruggen, Rotterdam (NL)

( * ) Notice: Subject to any disclaimer, the term of this patent is extended or adjusted under 35 U.S.C. 154(b) by 104 days.

(21) Appl. No.: 14/989,667

(22) Filed: Jan. 6, 2016

(65) Prior Publication Data

US 2016/0197938 A1 Jul. 7, 2016

Related U.S. Application Data (60) Provisional application No. 62/100,445, filed on Jan. 6, 2015.

(51) Int. Cl.
*G06F 21/16* (2013.01)

(52) U.S. Cl.
CPC ...... *G06F 21/16* (2013.01); *G06F 2221/0737* (2013.01); *G06F 2221/2115* (2013.01)

(58) Field of Classification Search
CPC .............. G06F 21/16; G06F 2221/2115; G06F 2221/0737; H04L 63/123
See application file for complete search history.

(56) References Cited

U.S. PATENT DOCUMENTS

| | | | | |
|---|---|---|---|---|
| 2004/0187005 A1* | 9/2004 | Molaro | ................... | G06F 21/10 713/176 |
| 2005/0203959 A1* | 9/2005 | Muller | ................... | G06Q 20/04 |
| 2006/0062426 A1* | 3/2006 | Levy | ....................... | G06F 21/10 382/100 |
| 2007/0033408 A1* | 2/2007 | Morten | ............... | H04L 63/1408 713/176 |
| 2007/0055689 A1* | 3/2007 | Rhoads | ............. | G06F 17/30026 |
| 2008/0027729 A1* | 1/2008 | Herre | ..................... | H04H 20/31 704/273 |
| 2009/0172406 A1* | 7/2009 | Cao | ........................ | G06F 19/323 713/183 |
| 2010/0169652 A1* | 7/2010 | Butler | ................... | G06T 1/0021 713/176 |

(Continued)

OTHER PUBLICATIONS

Jong Won Seok et al., "Audio watermarking for copyright protecting of digital audio data," Electronics letters, Jan. 4, 2001, vol. 37, No. 1, pp. 60-61. (Year: 2001).*

(Continued)

*Primary Examiner* — Luu T Pham
*Assistant Examiner* — Canh Le
(74) *Attorney, Agent, or Firm* — Mintz Levin Cohn Ferris Glovsky and Popeo, P.C.

(57) ABSTRACT

A digital marking module in a first computer memory receives a data file including original media content. The digital marking module accesses, from a second computer memory, identifying information corresponding to a recipient of the data file. The digital marking module generates altered media content to include the identifying information and substantially include the original media content. The data file with the altered media content is transmitted to a recipient device. The altered media content is received by a digital mark reader. The identifying information corresponding to the recipient of the data file is read from the altered media content.

16 Claims, 6 Drawing Sheets

(56) References Cited

U.S. PATENT DOCUMENTS

2014/0283123 A1* 9/2014 Lonstein ................. H04L 63/10
726/28
2015/0030201 A1* 1/2015 Holub ..................... G06T 1/005
382/100

OTHER PUBLICATIONS

Muhammad Arsalan et al., "Intelligent reversible watermarking in integer wavelet domain for medical images," the Journal of Systems & Software 85 (2012), pp. 883-894. (Year: 2012).*
Poulami Dutta, Debnath Bhattacharyya, and Tai-hoon Kim; Data Hiding in Audio Signal: A Review; International Journal of Database Theory and Application, vol. 2, No. 2, Jun. 2009.
Author Unknown; Videorooter: technology to uniquely identify video; https://www.kl.nl/en/projects/videorooter-technology-to-uniquely-identify-video/ ; Date Unknown.
Author Unknown; Spectrum View—Frequency Analysis Software; http://www.oxfordwaveresearch.com/j2/products/spectrumreview; 2016.
James Matthews; How Does Speech Recognition Work?; http://www.generation5.org/content/2002/howsrworks.asp; 2002.
Michel Rouzic; Photosounder; http://photosounder.com/ ; 2008.
Mike Russel; Audio Watermarking in Adobe Audition (Watermark Your Audio); https://www.youtube.com/watch?v=8uP4V3_uSok ; Apr. 23, 2013.
Mike Elmore; How to Watermark Your Recordings; https://www.youtube.com/watch?v=HwHE_siA5rM ; Jan. 7, 2011.

* cited by examiner

SYSTEMS AND METHODS FOR AUTHENTICATING DIGITAL CONTENT

CROSS-REFERENCE TO RELATED APPLICATIONS

The current application is related to/claims priority under 35 U.S.C. § 119(e) to U.S. Provisional Application No. 62/100,445 filed Jan. 6, 2015.

TECHNICAL FIELD

The subject matter described herein relates to authenticating digital content, such as to prevent content from being unlawfully copied, downloaded, shared or distributed.

BACKGROUND

Theft and unlawful copying, downloading, sharing and/or distributing digital content is incredibly problematic for digital content owners. Because it is relatively easy to digitally copy digital content, it is important for digital content owners to protect their content.

For example, if a user rents a movie on their television and records that movie, there is a risk that the user could try to upload that movie to the Internet. If that movie is uploaded to the Internet, other people could potentially download and watch that movie without paying for it. Alternatively, if a user lawfully purchases a document template, if that user uploads the document template to the Internet, others could be free to download the template without compensating the template owner. Alternatively still, if a user purchases a digital copy of music, there is a risk that the user uploads that music to the Internet to be allowed to be downloaded by others for free.

SUMMARY

In one aspect, a digital marking module in a first computer memory receives a data file including original media content. The digital marking module accesses, from a second computer memory, identifying information corresponding to a recipient of the data file. The digital marking module generates altered media content to include the identifying information and substantially include the original media content. The data file with the altered media content is transmitted to a recipient device. The altered media content is received by a digital mark reader. The identifying information corresponding to the recipient of the data file is read from the altered media content.

A third computer memory storing an association between the identifying information and the recipient of the received altered media content is accessed to determine an identity of the recipient. Data identifying the recipient associated with the received altered media content is provided.

In some variations, one or more of the following features can optionally be included in any feasible combination.

The generating can include embedding, in the original media content, the identifying information in a frequency encoded representation. The generating can also include distributing a plurality of components comprising the identifying information to locations throughout the altered media content, such that the identifying information is not human-readable when viewed in the frequency encoded representation. The identifying information can also include a key that can be required in order to play the altered media content.

The reading can include accessing the identifying information according to a mapping that specifies locations in the altered media content that contain the identifying information.

The original media content can be an audio file or a video file. Also, a user-perceptible message separate from the identifying information and the original media content can be displayed to the recipient and in response to the generating.

The transmitting of the altered media content can be based on receiving electronic confirmation that the identifying information matches some of transaction information provided by the recipient prior to the generating and the transmitting.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, the embedding of identifying information in digital content can be used to convey or confirm ownership of a copy of a digital work. Identifying information can be added to a digital file prior to completion of a purchase to discourage unlawful reproduction or distribution of the digital content. Identifying information can also be read from digital content to verify that a user in possession of the digital content is entitled to possess the digital content.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to systems and methods for authenticating digital data, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter provides a system that can be used to protect digital content that is uploaded or downloaded (using a computer, cable modem/TV, or other device), downloaded, streamed, physically copied (such as via USB or a DVD), in a physical media (such as a book, document, art, or photographs), or the like. Digital content can include, but is not limited to, audio information, music, the spoken word, presentations, interviews, podcasts, audiobooks, instructions, sound clips, movie clips, interviews, video, movies, clips, music videos, documentaries, instruction videos, webinars, documents, PDFs, word processing documents, spreadsheets, presentations, e-books, white papers, reports, articles, templates, checklists, contracts, images, graphics, photos, art, illustrations, portraits, tactile information, gustatory information, olfactory information, or the like.

In one implementation, to protect the rights of the provider of digital content, as well as ownership rights of a recipient of the digital content, personal identification information can be incorporated into the digital content at the time of transfer. The personal identification information can include one or more from the following, or be any other type of information that can be tracked to a specific person. That information can include: a name, address, user name, birthdate, fingerprint, retina information, facial characteristics, blood type, DNA, hair analysis, biometric information, a social security number or ID, an email address, a passport number, a driver's license, a driver's license number, a unique customer user ID, a bank account number, a voice print, or the like.

The system can be used by providers that include, for example, digital content providers, digital content creators (such as authors or musicians), digital content broadcasters (such as television or cable stations), customers using another protection mechanism that desire to increase the security of their digital content, or the like. When used on communication platforms, the system protects against recording and/or sharing the recording as the personal identification information is embedded in the audio/video stream, allowing the recording to be traceable. Digital product components that can use the system include, but are not limited to, customers of products used for creating digital products, membership platforms, companies using digital access passes, plugins webinar providers, digital product intermediaries, streaming services, broadcasting webstores, or the like.

Figure 1:
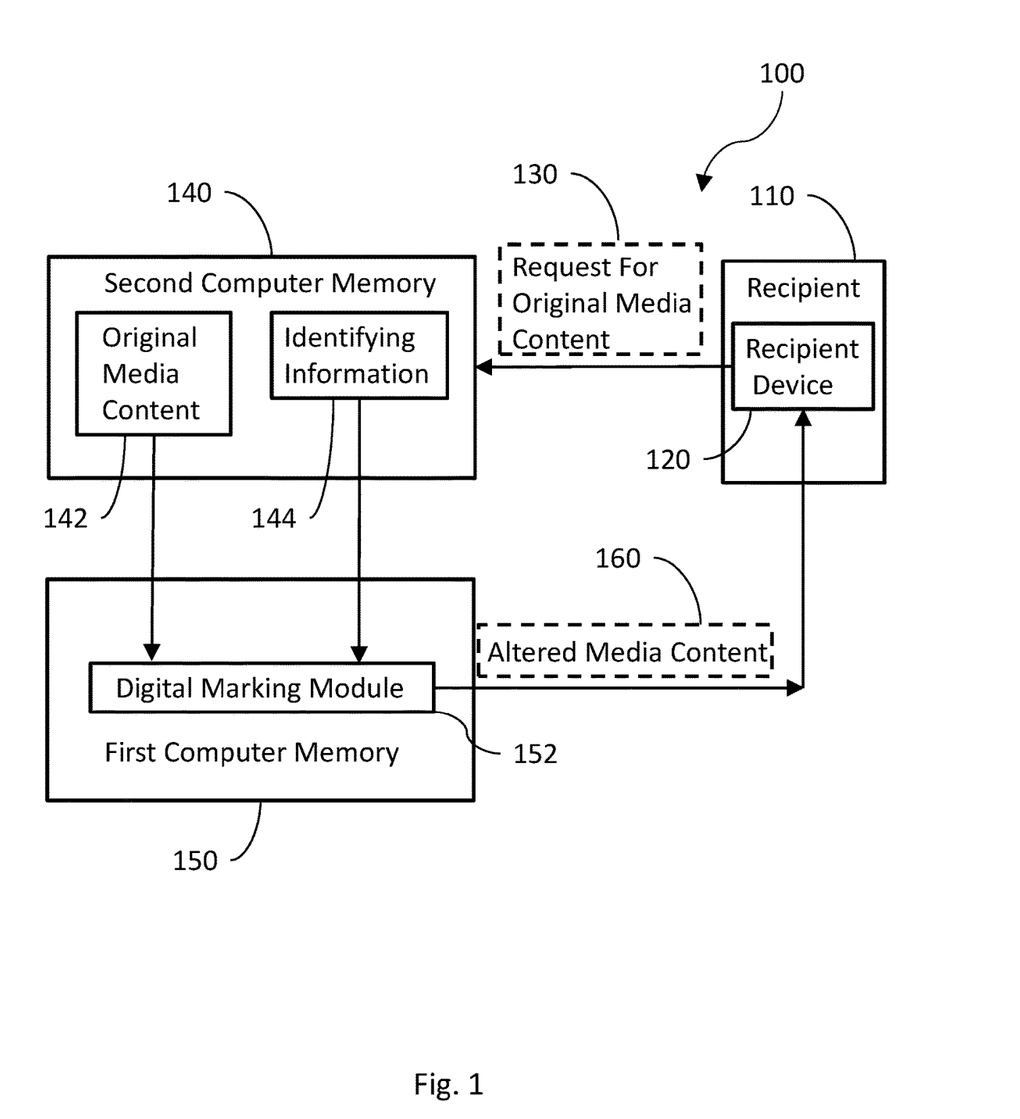
FIG. 1 is a system diagram illustrating original media content being altered to contain identifying information before being provided to a recipient device, according to one embodiment.

FIG. 1 is a system diagram 100 illustrating original media content 142 being altered to contain identifying information 144 before being provided to a recipient device 120, according to one embodiment.

Ownership of digital content can be established by the system embedding identifying information 144 inside original media content 142. The embedding can be noticeable by the consumer or hidden from the consumer (or recipient 110). The original consumer can be traced and located using the identifying information 144. In one implementation, the consumer can be notified that his or her identifying information 144 is embedded in the digital information in the data file they are downloading, preventing and deterring the consumer from unlawfully copying and/or sharing the digital content as the consumer will know that the identifying information 144 can be used to trace the unlawful copy back to the consumer.

When digital content is purchased lawfully, the consumer provides some type of personal identifying information to complete the purchase. Information from the transaction can be used as the identifying information 144 that is embedded in the digital content. Alternatively, other information could be required to complete the transaction such as a fingerprint, retinal scan, or other biometric information. Alternatively still, the identifying information 144 could already be stored from a previous purchase and used.

In the implementation shown in FIG. 1, a recipient device 120 provides a request 130 for original media content 142. The request 130 can be a download request, an upload request, a purchase, or the like. The request 130 can be initiated by a recipient, or can be automatically initiated by the recipient device 120 or any connected computing system. The request 130 can come from, for example, a mobile device, a smartphone, a website, an automated content distribution center (TV or computer/internet), or the like. In one implementation, the system can include a first computer memory 150 with a digital marking module 152 and a second computer memory 140 storing the original media content 142 and the identifying information 144. In other implementations, the original media content 142 and the identifying information 144 can be stored in separate computing systems or memory locations.

The digital marking module 152 can be a computer program responsible for applying identifying information 144 to the original media content 142, as described by the various methods herein. The digital marking module 152 can generate altered media content 160 embedding the identifying information 144 in a data file that can substantially include the original media content 142. In the event that the identifying information 144 overwrites a portion of the original media content 142, a substantial portion of the original media content 142 will remain unaffected by the embedded identifying information 144. In another implementation, the identifying information 144 can be appended to the original media content 142 without overwriting any of the original media content 142.

The identifying information 144 can include some or all of the identifying information 144 provided by the recipient and can also include additional identifying information 144 provided by a source other than the recipient. For example, in one implementation, the identifying information 144 can include the recipient name, the digital content providers name, time/date of purchase, logos, or the like, in any combination. The altered media content 160 can be transmitted to the recipient device 120 after the identifying information 144 has been embedded. In another implementation, the transmission of the altered media content 160 can be dependent on receiving electronic confirmation that the identifying information 144 matches some or all of the transaction information provided by the recipient 110. The confirmation can occur prior to generating and transmitting the altered media content 160. For example, a request for download can initiate a test for a match between the identifying information 144 of the recipient making the request and the stored purchasing information for the digital content. If they do not match, this can indicate that the recipient may be attempting an improper download of digital content belonging to another user.

Figure 2:
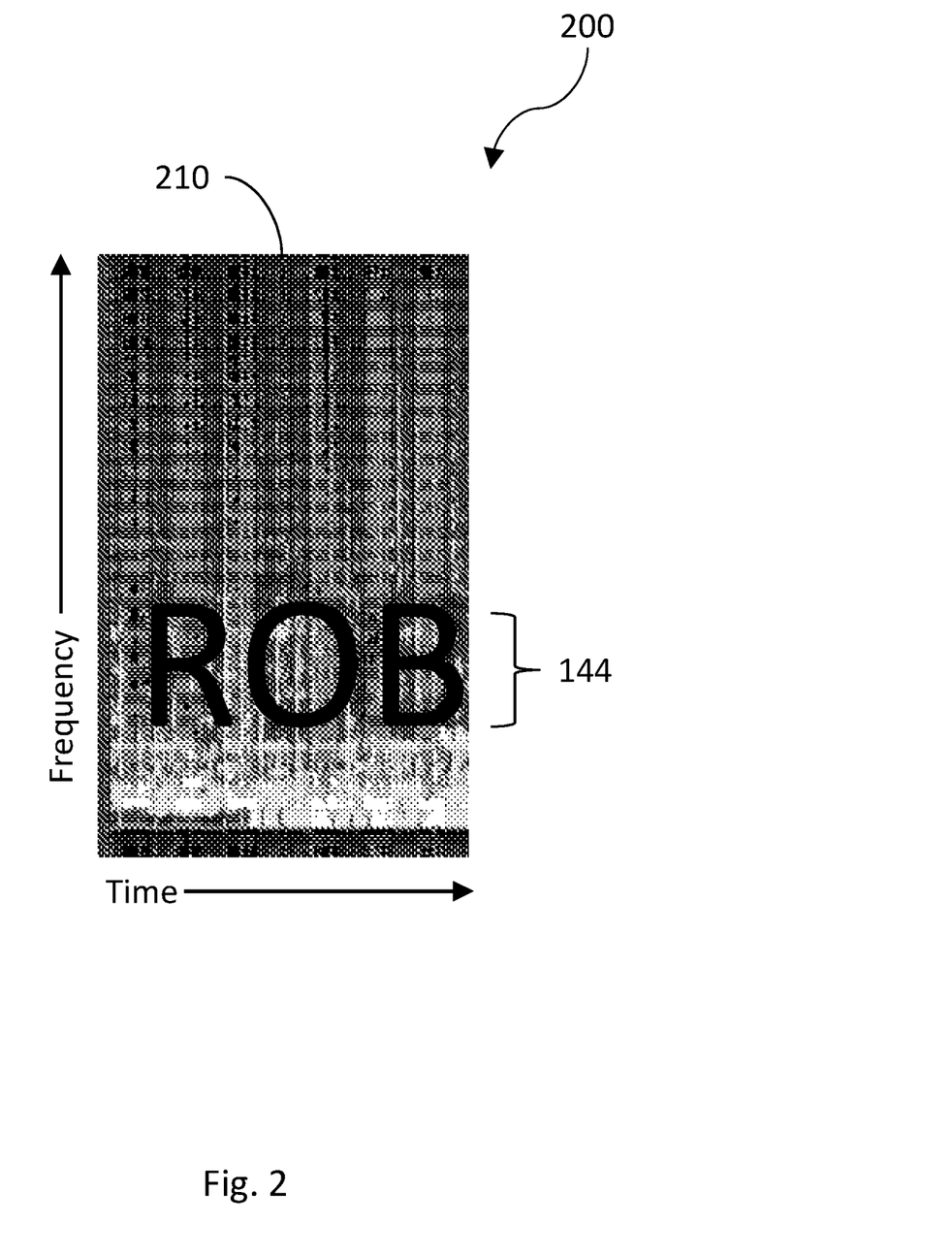
FIG. 2 is a diagram illustrating a spectrogram of altered media content showing the identifying information, according to one embodiment.

FIG. 2 is a diagram 200 illustrating a spectrogram 210 of altered media content 160 showing the identifying information 144, according to one embodiment. This provides one example of embedding identifying information 144 into digital content and is discussed further below.

In one implementation, the identifying information 144 embedded in the digital content can be hidden from the consumer. For example, the information can be unnoticeable by the consumer, but can be detected and viewed by the system. In one implementation, this is accomplished using steganography technology. As shown in FIG. 2, altered media content 160 can be viewed as a spectrogram 210 where the identifying information 144 can be embedded in a frequency encoded representation. In another implementation, the identifying information 144 is embedded in the digital content using a watermark. According to another implementation, the altered media content 160 can keep track of how many times it was uploaded or downloaded, such that this information becomes part of the identifying information 144.

In one implementation, the identifying information 144 is encoded in a way that a consumer could not search the altered media content 160 to find where the identifying information 144 is located. This encoding can use an encryption/decryption algorithm to encode the information. For example, the identifying information 144 can be separated into a number of components. The components can then be distributed throughout the altered media content 160 such that the identifying information 144 is not human-readable in any representation, including, for example, the raw form of the altered media content 160 or the frequency-encoded representation.

In one implementation, a mapping can be applied to the altered media content 160 to read the identifying information 144. This can be similar to a decryption process, where the mapping specifies locations in the data file that contain the identifying information 144. The locations can be read out and the identifying information 144 can be assembled.

Examples of embedding the identifying information 144 are as follows:

Digital Audio Information.

As noted above, audio information, such as music, can be embedded with the identifying information 144 at the time of purchase. In one implementation, a frequency can be added on top of one or more of the audio tracks. For example, the identifying information 144 can be added as a waveform on top of the content waveform, such as shown at http://www.sersc.org/journals/IJDTA/vol2_no2/1.pdf, "Data Hiding in Audio Signal: A Review," by Poulami Dutta, Debnath Bhattacharyya, and Tai-hoon Kim, International Journal of Database Theory and Application, Vol. 2, No. 2, June 2009, which is incorporated by reference herein, in its entirety.

In an alternative implementation, before the digital file is delivered, the digital file is slightly edited to include the identifying information 144. For example, a small portion of the digital file can be added to or subtracted from the digital file. Alternatively, an image can be put in the digital file such that a frequency-encoded representation shows an image of the identifying information 144. One example is given in FIG. 2 where the word "ROB" has been embedded in the data file by altering the digital makeup of the frequency-encoded information of the original media content 142.

The image will not substantially affect the audio file, but is embedded in the file. After the identifying information 144 has been applied, the altered media content 160 can be delivered to the consumer or recipient 110. One method of encoding the audio file can be done as shown via (https://www.youtube.com/watch?v=8uP4V3_uSok (Mike Russel) Apr. 23, 2013), which is incorporated by reference in its entirety.

Alternatively still, before the file is delivered to the consumer, the audio file is merged with a new track. This track contains the identifying information 144. By merging the two audio files, the result will be one audio file that contains the original audio and at a certain point (or multiple points) in time the identifying information 144 can be heard. This is akin to a voiceover during a movie. The voiceover could mention the identifying information 144, such as an audio statement: "This audio file belongs to John Smith."

Alternatively still, the identifying information 144 can be converted to a tone (frequency and volume), such as a beep or short noise, that is heard at certain intervals. The tone can be not possible to be heard or be audible (or barely audible). The tone information can be added at specific intervals, such as shown via (https://www.youtube.com/watch?v=HwHE_siA5rM (Mike Elmore), 2011), which is incorporated by reference in its entirety.

In an alternative implementation, the identifying information 144 is embedded in static in the music file. Almost every digital audio content file has some type of background noise. Most of the time, this background noise is not audible. In that background noise, the identifying information 144 can be embedded.

In an alternative implementation, the identifying information 144 is encoded in waveforms in the digital content. This type of technology is called audio steganography. Because the identifying information 144 is part of the audio waveforms, even if the digital content is recorded into a different format, the identifying information 144 will remain intact.

In an alternative implementation, a sound bite or an audio watermark is mixed into the digital audio. This renders the sound bite or watermark part of the actual audio track. Hence, it is difficult to remove or alter the sound bite or watermark. The sound bite(s) or watermark can be embedded at multiple timestamps to make it even more difficult to remove.

Digital Video Information

In one implementation, for digital video information, an embedded audio signal is used, as described above. In another implementation, during static moments in the video (such as where there is static or a blank screen), the identifying information 144 is embedded in the video, similar to the audio information. The embedded information can be such that it can be viewed as a particular image or is hidden and is not viewable.

In another implementation, a video signal is encoded into the digital video track, such as for an audio track above.

In one implementation, an overlayed video image is used to embed the identifying information 144. This can have the appearance of a logo or image in the corner of the screen, similar to a news station logo. Alternatively, it can be a phrase or word, such as when an overlay is used for a "preview screening only" or "live video" on top of the video feed or as a semi-transparent image on the video track.

Digital Documents

For digital documents, such as word processing or PDF files, in one implementation, the identifying information 144 can be tagged at the end of the file using a few bytes of information. The identifying information 144 can be stored at a fixed or variable location within the file. In one implementation, it can be not visible, making it more difficult for the consumer to attempt to remove it.

In another implementation, the identifying information 144 can be stored in fragmented locations, such that the entirety of the identifying information 144 is stored on multiple places inside the file. The system can recombine the information when it is needed. By storing the information in multiple locations, it makes it harder to locate and remove.

In another implementation, the identifying information 144 can be embedded into the actual data of the document, so that if a consumer attempts to remove the identifying information 144 the document is automatically corrupted. In one implementation, the original media content 142 can contain metadata describing how the content is to be interpreted, such as a format type like pdf, jpeg, mpeg, or the like. The identifying information 144 can be integrated with the metadata such that the file format becomes unrecognizable because removing the identifying information 144 corrupts the metadata. In another implementation, identifying information 144 can be incorporated as/with a key or password used to encode the remainder of the altered media content 160. It can then be required, by the file or the player, to overcome the encoding in order to play, alter, or copy the altered media content 160. In this way, removing the decoding key/password prevents the altered media content 160 from playing, being altered, being copied, or the like. In yet another implementation, the playing device (for example the recipient device 120) could be required to check for identifying information 144. If no identifying information 144 is found, then the playing device can not play the file.

In another implementation, when a watermark is stamped on the document and then encrypted, the watermark can be embedded on all screens or pages, making it such that the identifying information 144 is present on every page. This watermark can be hidden, or placed in a corner, or across the entire page, either in full solid color, bordered, with a high transparency, or the like, such that the text underneath is easy readable. When the watermark spans the entire page, even when the document is printed and copied, the original identifying information 144 can still be visible.

Digital Images

For digital images, the identifying information 144 can be embedded similarly to the above other types of files. In one implementation, a watermark can be used such that it is visible with the image or hidden. Alternatively, the watermark can be accessible only using special codes or functions.

Other File Types.

For other file types, the system can embed identifying information 144 in a number of ways. In one implementation, the identifying information 144 is tagged at the end of the file in a few bytes of information. Alternatively, the identifying information 144 can be stored on a fixed location inside the file. Alternatively still, the identifying information 144 can be inserted in many places within the file and the location can be stored at the end of the file or known by the system. This makes the information harder to find inside the file. Alternatively still, the identifying information 144 can be stored in fragmented locations so that the entire information is stored on multiple places inside the file. When needed, the system retrieves the information from the multiple locations and is combined. Alternatively still, the identifying information 144 is stored in multiple locations with multiple copies, so that even if someone were able to remove the information from one of the many fragmented locations, the other locations are still present. Alternatively still, the identifying information 144 is copied onto multiple locations within the file, such that if one is found, there are multiple, redundant copies of the identifying information 144 within the file. Alternatively still, the identifying information 144 can be embedded, such that if there is an attempt to remove the identifying information 144, the document becomes corrupted.

In one implementation, the system protects against illegal sharing of digital content. A provider offers for sale digital content that they want only paying consumers to access. This can be for example, a rented movie or a song. The identifying information 144 is embedded into the file when the purchase is made, using the purchaser's name and address (provided with the credit card information). If the consumer then shares the digital file with a friend, that copy also contains the identifying information 144 of the downloading consumer. If the consumer uploads the digital file on the Internet to be unlawfully shared, the file still maintains the consumer's identifying information 144. When the provider discovers the unlawful copies, the provider can look at the digital file and see the identifying information 144 of the original consumer that shared the digital content. Using that identifying information 144, the provider can then choose to pursue the consumer legally.

In another implementation, a provider of digital content does not want anyone to make additional copies of digital content. This can be a trade secret document, a preview copy of a movie or music, a highly sensitive audio file, or the like. If digital copies are made, the identifying information 144 of the original consumer is still embedded in the digital copy, making it easier to pursue the consumer. More importantly, knowing that there is identifying information 144 embedded in the file, the consumer is much more likely to be deterred from unlawfully copying the digital file.

In another implementation, the system employs technology that is used to prevent the identifying information 144 from being circumvented. In one implementation, a user uses false or untrue information when acquiring digital content. However, because the system embeds the digital content with information provided from the purchase, the consumer would have to provide false information associated with the purchase, which should be hard to accomplish because the information is verified by the credit card company. Moreover, many times digital content requires an email address to be delivered. The email address can be part of the identifying information 144 embedded in the digital file, making it easier to track the original consumer. By tying the identifying information 144 to the time of purchase, the system helps make sure the information is accurate.

If a consumer is using a gift card, credit card, or the like, the system can require a verifiable email address, phone number or the like, whereby the user confirms that the email address or phone number is legitimate. Thus, the consumer can be traced using that email address or phone number. Alternatively, biometric information can be used to verify the consumer, such as a fingerprint, a retinal scan, or the like.

According to another implementation, a consumer attempting to bypass the system can try to use the identity of another person when making the purchase. This can be something that was permitted (such as borrowing from a friend) or not permitted (such as a stolen identity). Regardless, when the purchase is made, the information can be embedded and thus still traceable to the other consumer (for example the friend in which the information was borrowed). Hence, the friend can either be responsible for that content, or notify an entity attempting to trace the content to which they had lent their information. If an identity was stolen, the system could notify uploading sites such that they do not allow files containing information relating to the stolen identity.

Alternatively, once the identify thief is identified, his or her unlawful copies can be traced back to him or her by using the identifying information 144 he or she stole.

In another implementation, a consumer may attempt to remove personal identification information from the digital content after being embedded. As the personal identification information will be embedded in the digital content, there is a risk that removing the embedded information could interfere or damage the original digital content. Further, the digital content players can require that there be embedded identifying information 144 in order to play the digital information. The identifying information 144 can also be verified that it is legitimate (such as by checking with a company server) before playing the content each time.

Figure 3:
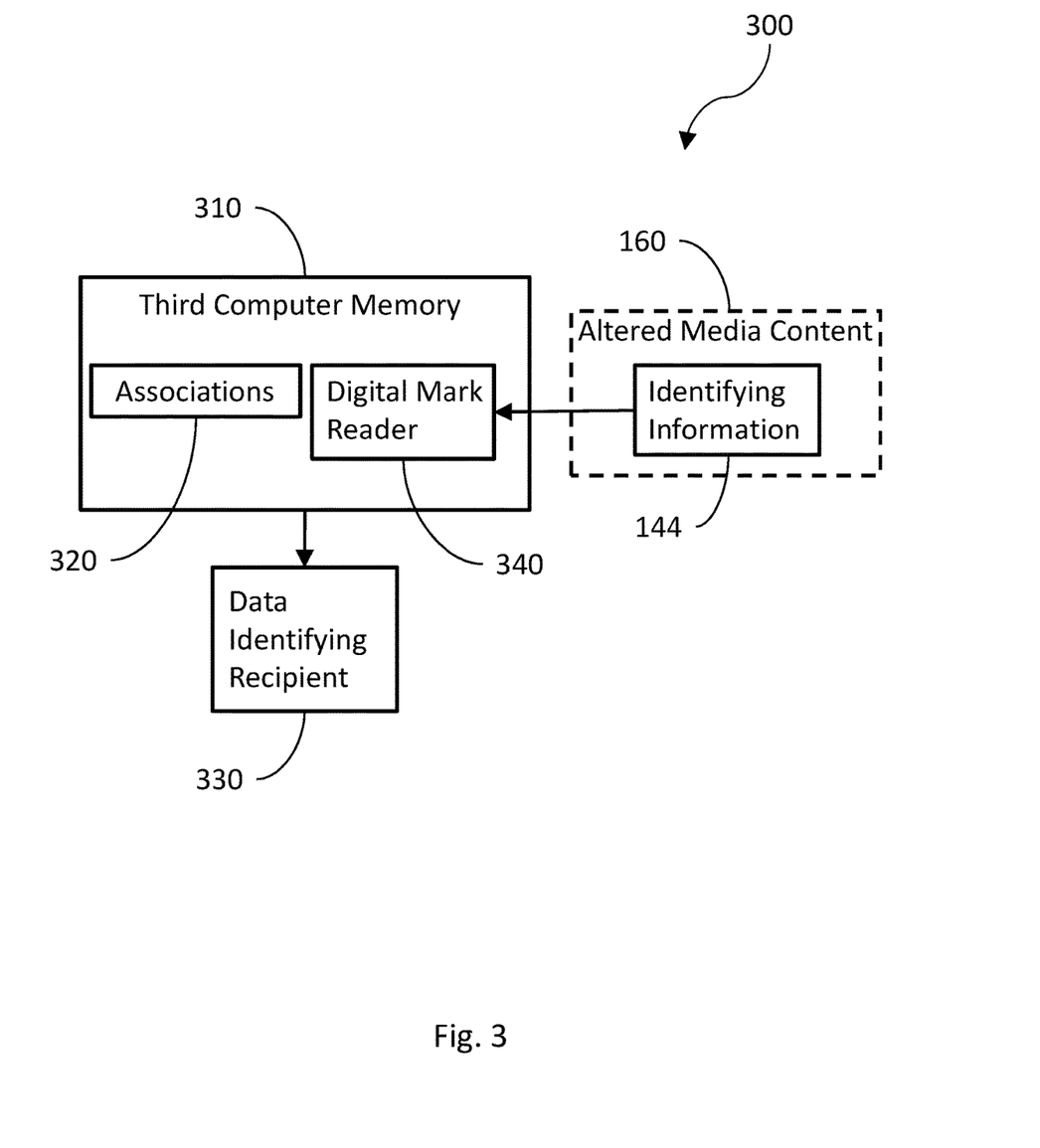
FIG. 3 is a diagram illustrating reading identifying information from the altered media content and providing data identifying a recipient of the altered media content, according to one embodiment.

FIG. 3 is a diagram illustrating reading identifying information 144 from the altered media content 160 and providing data identifying a recipient 110 of the altered media content 160, according to one embodiment.

In one implementation, the system can access altered media content 160 found in other devices, scraped from the Internet, stored in databases or servers, or the like. The identifying information 144 in the data file of the altered media content 160 can be searched for and/or read by the system. The altered media content 160 can be copied to, or read by, a digital mark reader 340. The digital mark reader 340 can be a computer program capable of looking for identifying information 144 in digital content. The digital mark reader 340 can, for example, look for a particular type of identifying information 144, in a particular format or location in the digital content. The digital mark reader 340 can be pre-loaded with locations/formats in the digital content for expected identifying information 144. For example, the digital mark reader 340 could read particular times, locations, frequencies, headers, footers, and so on, in the digital content. If identifying information 144 is found, then the system can proceed to determine an identity of the recipient 110 that is associated with the digital content.

In the example of FIG. 3, a third computer memory can store associations between known altered media content 160 and recipients 110 of the altered media content 160. The system can then match the identifying information 144 with the stored associations and then provide data identifying the recipient 110 to another user or computing system. The associations can be in the form of purchase records, lawful transfers, licenses, or the like.

For example, the provider can search the Internet looking for unlawful copies of its digital files. When it finds unlawful files, it can extract the identifying information 144 and take appropriate action (such as contacting the consumer; pursuing the consumer legally; having the digital files banned on search engines; or the like). Other enforcement actions can include banning the consumer from various websites, having the consumer not be allowed to upload/download files from file sharing sites, notifying the authorities, notifying file sharing companies, notifying search engine companies, or the like.

Figure 4:
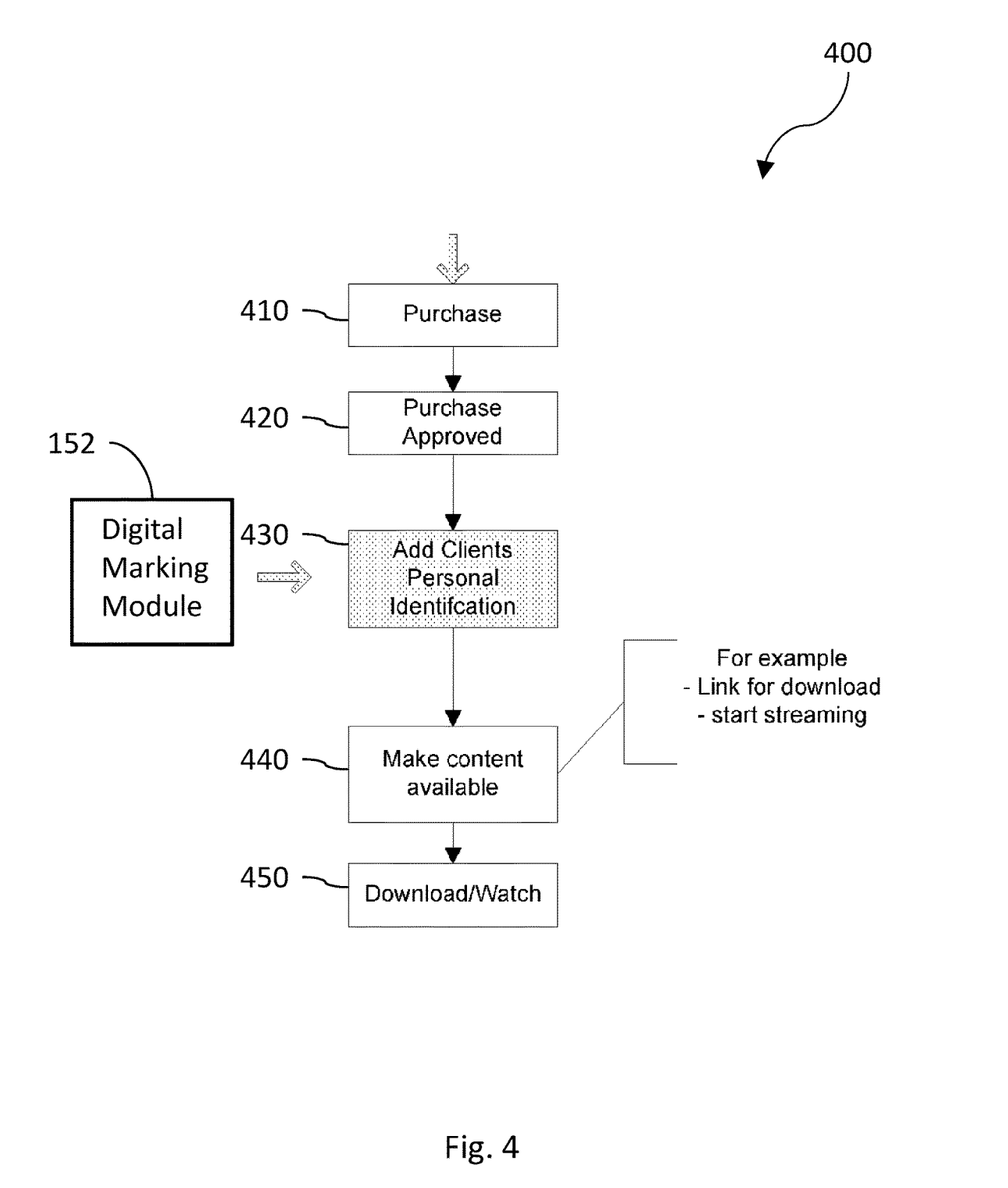
FIG. 4 is a process flow diagram illustrating a digital marking module inserting identifying information in the process of purchasing digital content for download according to one embodiment.

FIG. 4 is a process flow diagram 400 illustrating the digital marking module 152 inserting identifying information 144 in the process of purchasing digital content for download, according to one embodiment. At 410, a request for purchase of digital content can be received by a provider of digital content. At 420, the purchase can be approved. In some implementations, the purchase can include registration of the consumer, login by a consumer, payment by a consumer, payment information of the consumer, and only then, access to the data by the consumer. If the system has not collected identifying information 144 of the type that the system desires to embed, the system can request that information (such as a fingerprint). However, if that information was previously provided, the system can use previously provided information. In another implementation, the system can verify that the information is still accurate before completing the transaction. At 430, the digital marking module 152 can add the purchasers identifying information 144 to the digital content. At 440, after the identifying information 144 has been added, the altered media content 160 can be made available for immediate transfer, or transfer at a later time. At 450, the altered media content 160 can be downloaded/watched by the purchaser.

Figure 5:
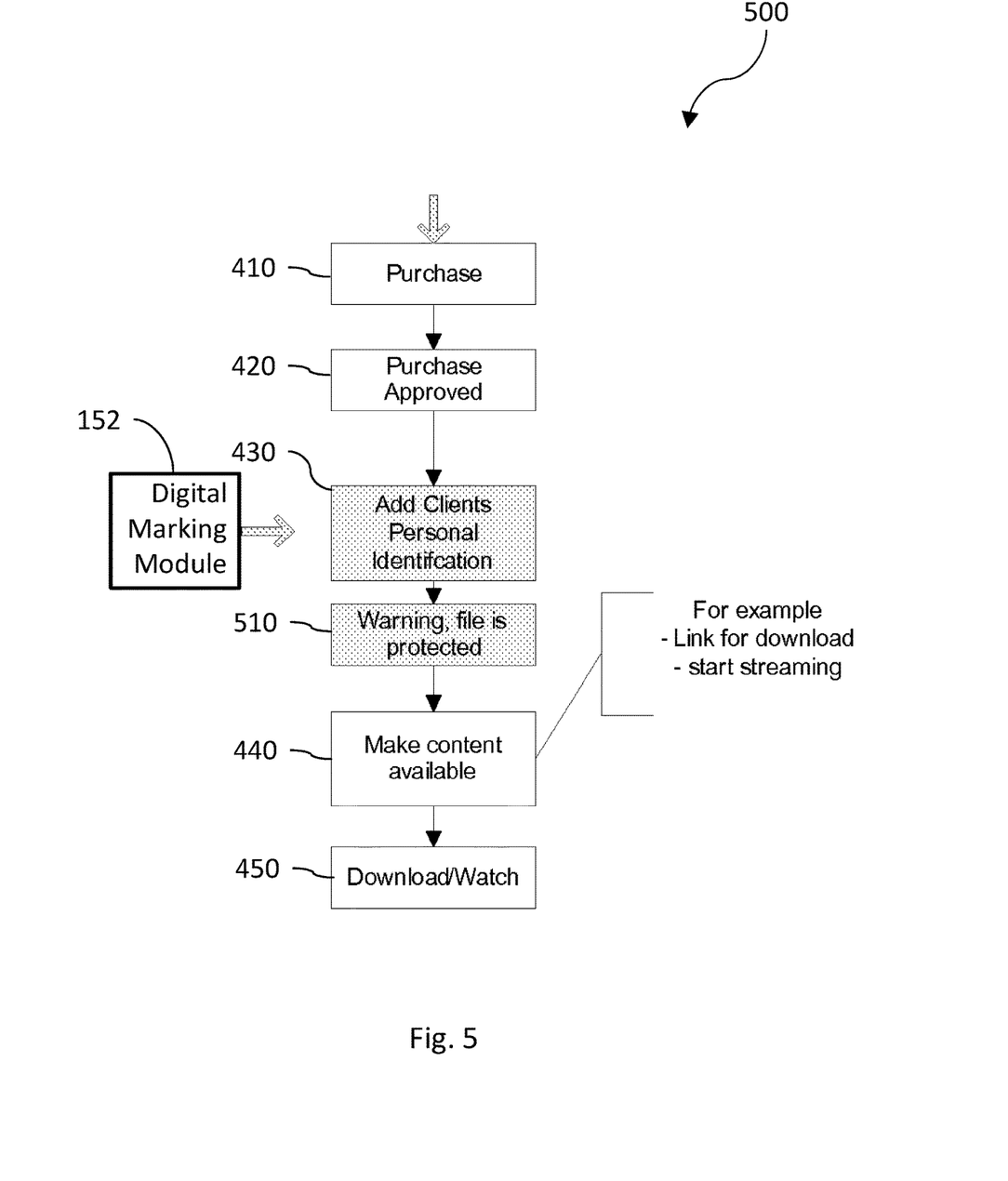
FIG. 5 is a process flow diagram illustrating displaying a warning to a recipient of the altered media content, according to one embodiment.

FIG. 5 is a process flow diagram 500 illustrating displaying a warning to a recipient of digital content according to one embodiment. The process illustrated in FIG. 5 is similar to that described in reference to FIG. 4. Here, another feature is shown that, at 510, includes providing displaying a user-perceptible message to the recipient. The displaying of the user-perceptible message can be in response to the generating of the altered media content 160, for example, as final step in the process. Alternatively, the displaying can occur prior to the generation, for example, as a confirmation that the recipient wishes to proceed with the process. In another implementation, a warning is displayed to the recipient, warning them that their identifying information 144 is embedded within the digital file and sharing the digital file will result in their identifying information 144 being shared. The user-perceptible message can be separate from the identifying information 144 and the original media content 142, for example, appearing as a displayed warning or confirmation as described above.

Figure 6:
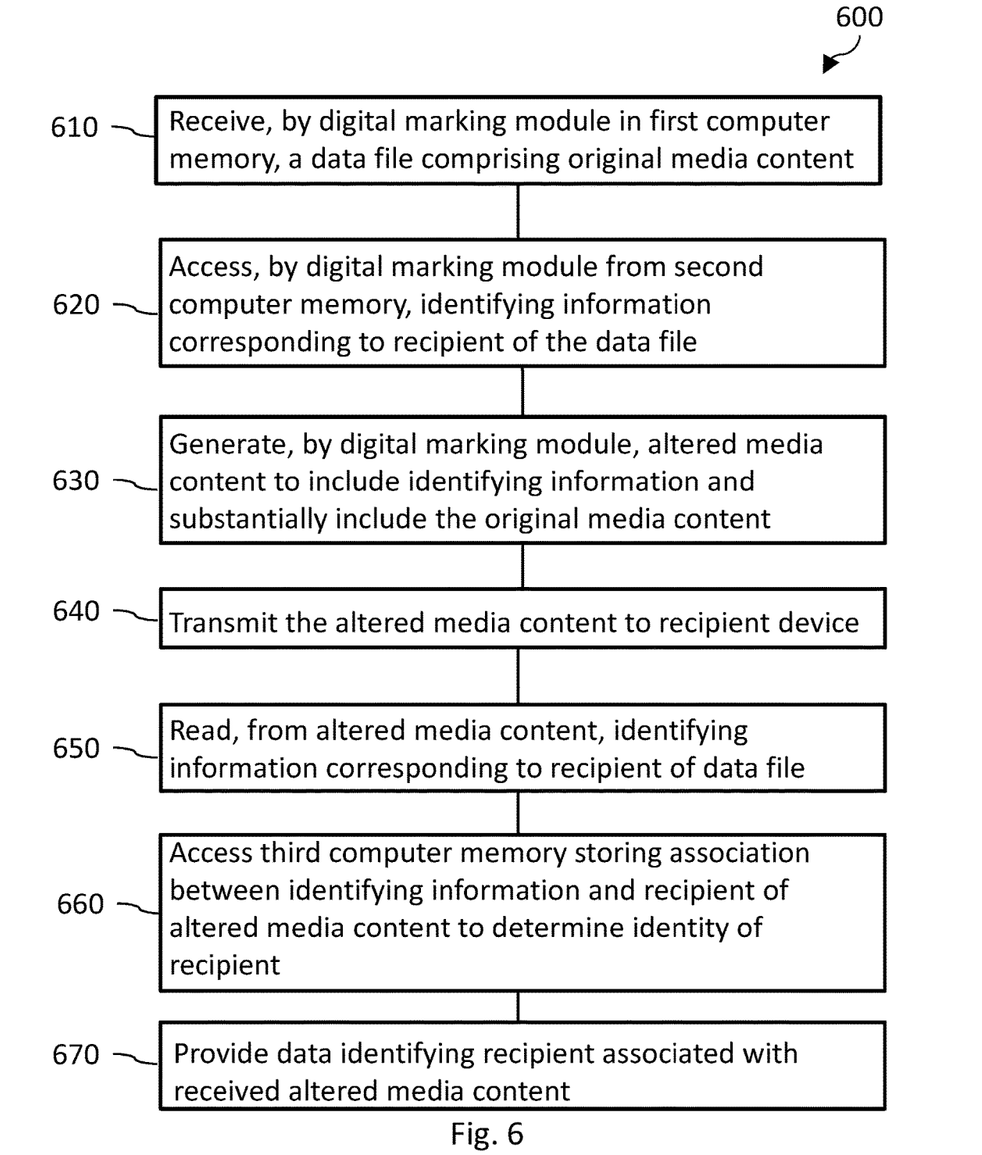
FIG. 6 is a process flow diagram illustrating providing identifying information based on reading of the altered media content, according to one embodiment.

FIG. 6 is a process flow diagram 600 illustrating providing identifying information 144 based on reading of the altered media content 160 according to one embodiment.

At 610, a data file including original media content 142 can be received by digital marking module 152 in first computer memory 150.

At 620, identifying information 144 corresponding to the recipient of the data file can be accessed by the digital marking module 152 located in a second computer memory 140.

At 630, the digital marking module 152 can generate altered media content 160 to include identifying information 144 and substantially include the original media content 142.

At 640, the altered media content 160 can be transmitted to the recipient device 120.

At 650, identifying information 144 corresponding to the recipient of data file can be read from the altered media content 160.

At 660, a third computer memory storing associations between the identifying information 144 and the recipient of altered media content 160 can be accessed to determine an identity of the recipient.

At 670, data identifying the recipient associated with received altered media content 160 can be provided.

As mentioned herein, the system herein can be used to prevent consumers from unlawfully uploading or downloading digital files. The system can be a dedicated application that embeds files, can be a dedicated computer that embeds files, or can be used with desktop computers, laptop computers, mobile computing devices such as tablets, smartphones, palm-sized devices (e.g., mobile phones), and wearable electronic interfaces (e.g., watches).

Because of the high-level nature and complexity of the selections and methods described herein, including the multiple and varied combinations of different masks, the calculations, computations and selections cannot be done in real time quickly or at all by a human. The processes described herein rely on the machines described herein.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, or the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving, by a digital marking module in a first computer memory, a data file comprising original media content to be accessed by a recipient as part of a transaction;
accessing, by the digital marking module from a second computer memory, identifying information corresponding to the recipient of the data file, wherein the recipient can be traced by the identifying information;
generating, by the digital marking module, altered media content to include the identifying information and substantially include the original media content, wherein the identifying information is embedded in the original media content in a frequency encoded representation to generate the altered media content, wherein the identifying information is subsequently identifiable when accessing the altered media content, and wherein the identifying information includes a key that is required to play the altered media content;
transmitting, by the digital marking module and in response to a confirmation that the identifying information matches transaction information provided by the recipient, the data file comprising the altered media content to a recipient device;
providing, by the digital marking module and to the recipient, a notification indicating that the altered media content includes the identifying information;
receiving, by a digital mark reader subsequent to transmission to the recipient device of the data file comprising the altered media content, the altered media content;
reading, from the altered media content received by the digital mark reader, the identifying information corresponding to the recipient of the data file;
accessing a third computer memory storing an association between the identifying information and the recipient of the received altered media content to determine an identity of the recipient; and
providing data identifying the recipient associated with the received altered media content.

2. The method of claim 1, the generating comprising distributing a plurality of components comprising the identifying information to locations throughout the altered media content that are not human-readable when viewed in the frequency encoded representation.

3. The method of claim 1, the reading comprising accessing the identifying information according to a mapping that specifies locations in the altered media content that contain the identifying information.

4. The method of claim 1, further comprising displaying, to the recipient and in response to the generating, a user-perceptible message separate from the identifying information and the original media content.

5. The method of claim 1, wherein the original media content is an audio file or a video file.

6. The method of claim 1, wherein the transmitting of the altered media content is based on receiving electronic confirmation that the identifying information matches at least a portion of transaction information provided by the recipient prior to the generating and the transmitting.

7. A computer program product comprising a non-transient, machine-readable medium storing instructions which, when executed by at least one programmable processor, cause the at least one programmable processor to perform operations comprising:
receiving, by a digital marking module in a first computer memory, a data file comprising original media content to be accessed by a recipient as part of a transaction;
accessing, by the digital marking module from a second computer memory, identifying information corresponding to the recipient of the data file, wherein the recipient can be traced by the identifying information;
generating, by the digital marking module, altered media content to include the identifying information and substantially include the original media content, wherein the identifying information is embedded in the original media content in a frequency encoded representation to generate the altered media content, wherein the identifying information is subsequently identifiable when accessing the altered media content, and wherein the identifying information includes a key that is required to play the altered media content;
transmitting, by the digital marking module and in response to a confirmation that the identifying information matches transaction information provided by the recipient, the data file comprising the altered media content to a recipient device;
providing, by the digital marking module and to the recipient, a notification indicating that the altered media content includes the identifying information;
receiving, by a digital mark reader subsequent to transmission to the recipient device of the data file comprising the altered media content, the altered media content;
reading, from the altered media content received by the digital mark reader, the identifying information corresponding to the recipient of the data file;
accessing a third computer memory storing an association between the identifying information and the recipient of the received altered media content to determine an identity of the recipient; and
providing data identifying the recipient associated with the received altered media content.

8. The computer program product of claim 7, the generating comprising distributing a plurality of components comprising the identifying information to locations throughout the altered media content that are not human-readable when viewed in the frequency encoded representation.

9. The computer program product of claim 7, the reading comprising accessing the identifying information according to a mapping that specifies locations in the altered media content that contain the identifying information.

10. The computer program product of claim 7, wherein the original media content is an audio file or a video file.

11. The computer program product of claim 7, wherein the transmitting of the altered media content is based on receiving electronic confirmation that the identifying information matches at least a portion of transaction information provided by the recipient prior to the generating and the transmitting.

12. A system comprising:
a programmable processor; and
a non-transient machine-readable medium storing instructions which, when executed by the processor, cause the at least one programmable processor to perform operations comprising:
receiving, by a digital marking module in a first computer memory, a data file comprising original media content to be accessed by a recipient as part of a transaction;
accessing, by the digital marking module from a second computer memory, identifying information corresponding to the recipient of the data file, wherein the recipient can be traced by the identifying information;

generating, by the digital marking module, altered media content to include the identifying information and substantially include the original media content, wherein the identifying information is embedded in the original media content in a frequency encoded representation to generate the altered media content, wherein the identifying information is subsequently identifiable when accessing the altered media content, and wherein the identifying information includes a key that is required to play the altered media content;

transmitting, by the digital marking module and in response to a confirmation that the identifying information matches transaction information provided by the recipient, the data file comprising the altered media content to a recipient device;

providing, by the digital marking module and to the recipient, a notification indicating that the altered media content includes the identifying information;

receiving, by a digital mark reader subsequent to transmission to the recipient device of the data file comprising the altered media content, the altered media content;

reading, from the altered media content received by the digital mark reader, the identifying information corresponding to the recipient of the data file;

accessing a third computer memory storing an association between the identifying information and the recipient of the received altered media content to determine an identity of the recipient; and providing data identifying the recipient associated with the received altered media content.

13. The system of claim 12, the generating comprising distributing a plurality of components comprising the identifying information to locations throughout the altered media content that are not human-readable when viewed in the frequency encoded representation.

14. The system of claim 12, the reading comprising accessing the identifying information according to a mapping that specifies locations in the altered media content that contain the identifying information.

15. The system of claim 12, wherein the original media content is an audio file or a video file.

16. The system of claim 12, wherein the transmitting of the altered media content is based on receiving electronic confirmation that the identifying information matches at least a portion of transaction information provided by the recipient prior to the generating and the transmitting.

* * * * *